3,547,523
ZOOM OBJECTIVE LENS SYSTEM WITH HIGHLY REDUCED SECONDARY CHROMATIC ABERRATION
Tadashi Kojima, Tokyo, Japan, assignor to Konishiroku Photo Industry Co., Ltd.
Filed July 10, 1968, Ser. No. 743,875
Claims priority, application Japan, July 13, 1967, 42/44,873
Int. Cl. G02b 9/00, 9/34, 15/14
U.S. Cl. 350—184                                                     4 Claims

ABSTRACT OF THE DISCLOSURE

This invention is a zoom lens system in which secondary chromatic aberration is reduced. In this lens system, four lens components are arranged on a common optical axis. The first and third lens components have positive refractive power. The second and fourth lens components have negative refractive power. In a zoom lens system having a relatively long focal length, deterioration of performance due to an increase in chromatic and more particularly secondary chromatic aberration is a serious problem. In accordance with the present invention, a zoom lens system having totally reduced secondary chromatic aberration is obtained by the use of abnormal dispersion glass for only the first lens component. It is not necessary to effect the elimination of secondary chromatic aberration of individual lens components.

---

The invention relates to a zoom objective with high zoom ratio and more particularly, to such objective with reduced secondary chromatic aberration for use in a still camera. The term zoom ratio is defined herein as the ratio of the maximum focal length to the minimum.

Zoom objectives covering a wide angle region are known only in a few kinds. Such zoom objectives are objectionably large in construction as compared with interchangeable objectives of wide angle type, and for this reason it would be less probable that zoom objectives of such kind replace wide angle interchangeable objectives. On the other hand, relatively many kinds of zoom objectives are known which are designed to vary magnification principally in the region of longer focal lengths. As the focal length is increased, the dimension of these zoom objectives gradually approaches that of long focal interchangeable objectives, so that there is the possibility that long focal zoom objectives are used to replace most of long focal interchangeable objectives. However, the replacement is still impracticable with known zoom objectives, in particular when the focal length exceeds about 200 mm., because of degradation of performance mainly due to secondary or higher order chromatic aberrations that remain uncorrected in zoom objectives for longer focal lengths.

Therefore, it is an object of the invention to provide an improved zoom objective having a high zoom ratio in a region from standard to longer focal length in the order of 300 mm., wherein both axial and lateral secondary chromatic aberrations for longer focal lengths are sufficiently corrected to compare or excel those of usual interchangeable objectives.

In accordance with the invention, there is provided a zoom objective which comprises four lens components arranged on a common optical axis, first and third lens components each having positive refractive power, and second and fourth lens components each having negative refractive power, said second lens component being movable on the optical axis to vary the focal length of the whole system, said third lens component being movable on the optical axis so as to keep the final image position of the objective stationary, said second and third lens components being adapted to be closely spaced at a maximum focal length, a stop being disposed at a fixed position between said third and fourth lens components, wherein denoting refractive power or the inverse of individual focal lengths of said first, second and third lens components by $K_1$, $K_2$ and $K_3$, respectively, the following inequalities apply.

$$0.15|K_2| \leq K_1 \leq 0.35|K_2|$$
$$0.8|K_2| \leq K_3 \leq 1.2|K_2|$$

and wherein denoting the inverse of dispersive power for the C-line by $\nu_c$, denoting ratio of partial dispersion for the g- and F-lines by $\theta_{gF}$, thus $$\nu_c = \frac{n_F - 1}{n_F - n_c} \text{ and } \theta_{gF} = \frac{n_g - n_F}{n_F - n_c}$$

where $n_c$, $n_F$ and $n_g$ denote refractive indices for the C-, F- and g-lines, respectively, of the glass from which an associated lens member is made, and denoting $\nu_c$ and $\theta_{gF}$ of any positive lens member in the first lens component by $\nu_{1P}$ and $\theta_{1P}$, respectively, denoting $\nu_c$ and $\theta_{gF}$ for any negative lens member in the first lens component by $\nu_{1N}$ and $\theta_{1N}$, respectively, and using the similar denotations $\nu_{2P}$, $\theta_{2P}$ and $\nu_{2N}$, $\theta_{2N}$ and $\nu_{3P}$, $\theta_{3P}$ and $\nu_{3N}$, $\theta_{3N}$ for any positive or negative lens member, respectively, of the second and third lens components, respectively, the following inequalities apply:

$$|\theta_{1P} - \theta_{1N}| \leq 0.05$$
$$|\nu_{2P} - \nu_{3N}| \leq 8$$
$$|\theta_{2P} - \theta_{3P}| \leq 0.02$$
$$|\nu_{2N} - \nu_{3P}| \leq 8$$
$$|\theta_{2N} - \theta_{3P}| \leq 0.02$$

The necessity of above requirements will be described below.

Generally, it is known that when an optical system comprises a number of thin lens components arranged on an optical axis and having refractive power $K_1$, $K_2$ ... $K_R$, respectively, where R denotes the number of lens components, the axial and lateral primary chromatic aberrations $L(\lambda)$ and $T(\lambda)$ for a ray having wavelength $\lambda$ are given by the following:

$$L(\lambda) = h_1^2 \frac{K_1}{V_{\lambda 1}} + h_2^2 \frac{K_2}{V_{\lambda 2}} + \ldots + h_R^2 \frac{K_R}{V_{\lambda R}} \quad (1)$$

$$T(\lambda) = H \left\{ E_1 h_1^2 \frac{K_1}{V_{\lambda 1}} + E_2 h_2^2 \frac{K_2}{V_{\lambda 2}} + \ldots + E_R h_R^2 \frac{K_R}{V_{\lambda R}} \right\} \quad (2)$$

where $h_i$ for $i = 1, 2 \ldots R$ denotes paraxial height of a paraxial axial ray on an $i$-th lens component and $h_1$ is chosen equal to the focal length of the whole system, $E_i$ for $i = 1, 2 \ldots R$ is defined by the relationship $$E_i = \frac{1}{H} \cdot \frac{h_{p i}}{h_i}$$

H being Helmholtz-Lagrange invariant and $h_{pri}$ representing paraxial height of a paraxial principal ray, and $V_{\lambda i}$ is a quantity such that its inverse $1/V_{\lambda i}$ is referred to as equivalent dispersion of an $i$-th lens component for a ray of wavelength $\lambda$. When the $i$-th lens component comprises $n$ single thin lenses disposed in close contact, the above inverse may be represented as follows:

$$\frac{1}{V_{\lambda i}} = \frac{1}{K_i}\left(\frac{\phi_{i1}}{\nu_{\lambda i1}} + \frac{\phi_{i2}}{\nu_{\lambda i2}} + \ldots + \frac{\phi_{in}}{\nu_{\lambda in}}\right) \quad (3)$$

where $\phi_{ij}$, for $j=1, 2 \ldots n$, denotes refractive power of a $j$-th thin single lens in the $i$-th lens component, and $\nu_{\lambda ij}$, for $j=1, 2 \ldots n$, is the inverse of dispersive power for a ray of wavelength $\lambda$ of the glass from which the $j$-th thin single lens is made. Thus $\nu_\lambda$ may be defined as follows:

$$\nu_\lambda = \frac{n_F - 1}{|n_\lambda - n_F|} \quad (4)$$

where $n_F$ and $n_\lambda$ denote refractive indices of the glass for the F-line and a ray of wavelength $\lambda$, respectively.

Axial and lateral chromatic aberrations for a ray of different wavelength $\lambda'$ are $$L(\lambda') = h_1^2 \frac{K_1}{V_{\lambda'1}} + h_2^2 \frac{K_2}{V_{\lambda'2}} + \ldots + h_R^2 \frac{K_R}{V_{\lambda'R}} \quad (5)$$

$$T(\lambda') = H\left\{E_1 h_1^2 \frac{K_1}{V_{\lambda'1}} + E_2 h_2^2 \frac{K_2}{V_{\lambda'2}} + \ldots + E_R h_R^2 \frac{K_R}{V_{\lambda'R}}\right\} \quad (6)$$

where $$\frac{1}{V_{\lambda'i}} = \frac{1}{K_i}\left\{\frac{\phi_{i1}}{\nu_{\lambda'i1}} + \frac{\phi_{i2}}{\nu_{\lambda'i2}} + \ldots + \frac{\phi_{in}}{\nu_{\lambda'in}}\right\} \quad (7)$$

$$\nu_{\lambda'} = \frac{n_F - 1}{|n_{\lambda'} - n_F|} \quad (8)$$

Denoting the ratio of partial dispersion for ray of wavelengths $\lambda$ and $\lambda'$ by $\theta_{\lambda\lambda'}$, this is defined as follows:

$$\theta_{\lambda\lambda'} = \frac{\nu_\lambda}{\nu_{\lambda'}} = \frac{|n_{\lambda'} - n_F|}{|n_\lambda - n_F|} \quad (9)$$

When the relationship $\nu_{\lambda\lambda'} = \nu_\lambda/\theta_{\lambda\lambda'}$ obtained from the Equation 9 is substituted into the Equation 7, then we have $$\frac{1}{V_{\lambda'i}} = \frac{1}{K_i}\left(\frac{\phi_{i1}}{\nu_{\lambda i1}}\theta_{\lambda\lambda'i1} + \frac{\phi_{i2}}{\nu_{\lambda i2}}\theta_{\lambda\lambda'i2} + \ldots + \frac{\phi_{in}}{\nu_{\lambda in}}\theta_{\lambda\lambda'in}\right) \quad (10)$$

Since in a zoom objective, paraxial heights for the respective lens components differ from each other at any focal length of the zoom objective, it results that in order to eliminate axial and lateral chromatic aberrations for wavelength $\lambda$ independently from a particular value of focal length, the equivalent dispersion of every lens component for wavelength $\lambda$ must be null. Thus $$\frac{1}{V_{\lambda i}} = \frac{1}{K_i}\left(\frac{\phi_{i1}}{\nu_{\lambda i1}} + \frac{\phi_{i2}}{\nu_{\lambda i2}} + \ldots + \frac{\phi_{in}}{\nu_{\lambda in}}\right) = 0 \quad (11)$$

for $i = 1, 2 \ldots R$. In fact, the requirements given in the Equation 11 are substantially satisfied by known zoom objectives. If any concurrently satisfy the following requirements:

$$\frac{1}{V_{\lambda'i}} = \frac{1}{K_i}\left(\frac{\phi_{i1}}{\nu_{\lambda i1}}\theta_{\lambda\lambda'i1} + \frac{\phi_{i2}}{\nu_{\lambda i2}}\theta_{\lambda\lambda'i2} + \ldots + \frac{\phi_{in}}{\nu_{\lambda in}}\theta_{\lambda\lambda'in}\right) = 0 \quad (12)$$

for $i = 1, 2 \ldots R$. Then they could be said free of secondary chromatic aberration. However, in order to satisfy both the Equations 11 and 12, it is necessary that $$\theta_{\lambda\lambda'i1} = \theta_{\lambda\lambda'i2} = \ldots = \theta_{\lambda\lambda'in} \quad (13)$$

for $i = 1, 2 \ldots R$.

Figure 8A:
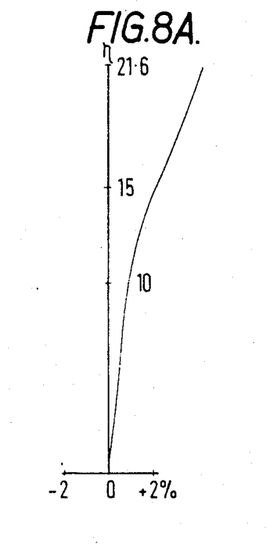
Figure 8B:
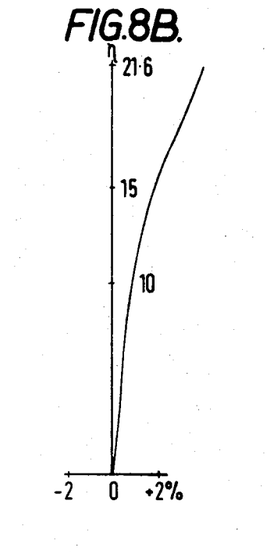
Figure 8C:
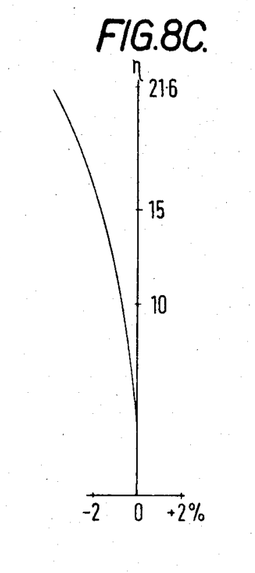
Figure 9A:
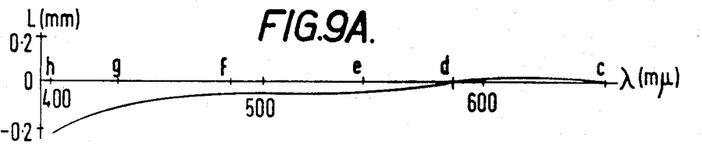
FIGS. 9A, 9B, 9C and FIGS. 10A, 10B, 10C show axial chromatic aberration, plotted against wavelength, of the two examples, respectively.
Figure 9B:
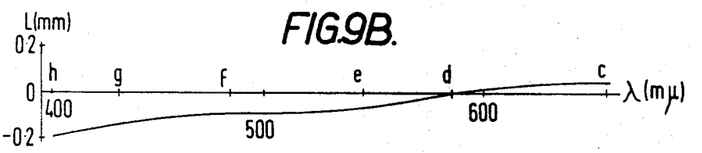
Figure 9C:
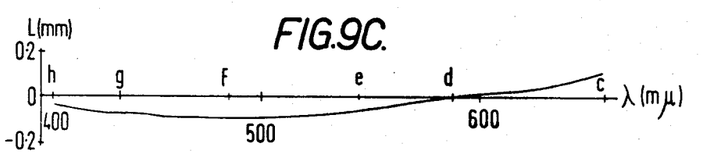
Figure 10A:
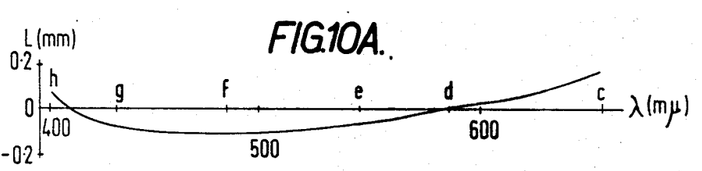
Figure 10B:
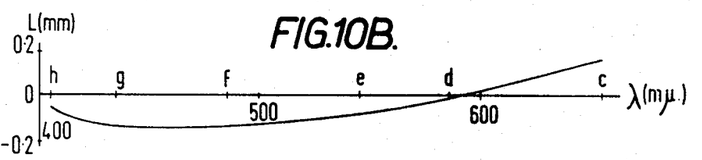
Figure 10C:
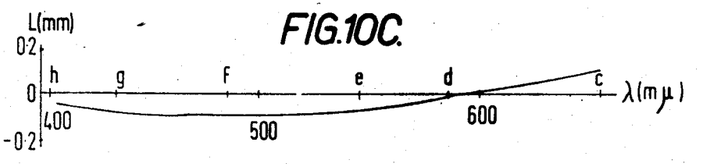
Figure 11A:
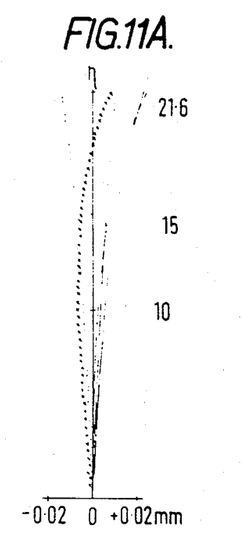
FIGS. 11A, 11B, 11C and FIGS. 12A, 12B, 12C show lateral chromatic aberration of the two examples, respectively, for rays of various wavelengths.
Figure 11B:
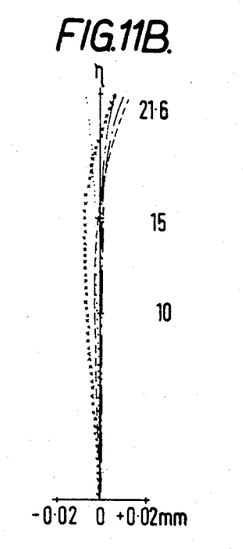
Figure 11C:
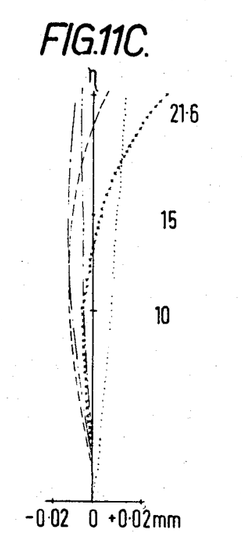
Figure 12A:
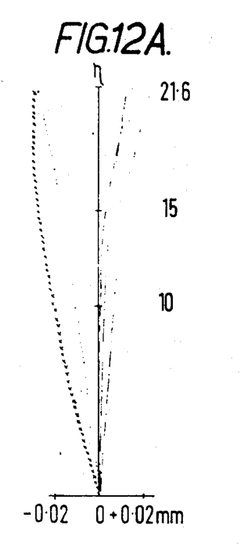
Figure 12B:
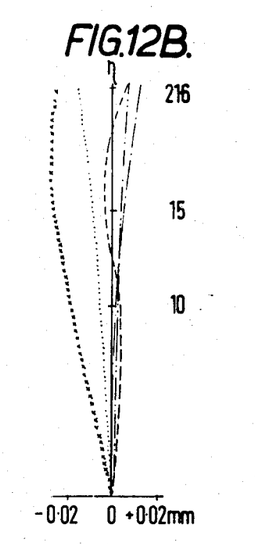
Figure 12C:
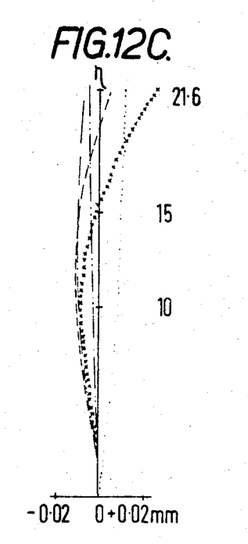
Figure 13:
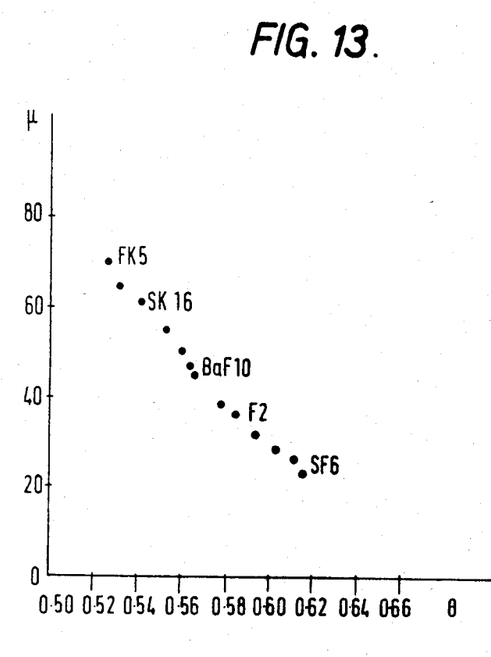
FIG. 13 is a graph showing the relationship between the inverse of dispersive power and the ratio of partial dispersion of various optical glasses.

This means that the glass materials chosen for each lens component must have the same ratio of partial dispersion, $\theta$. On the other hand, it will be seen from the Equation 11 that in order to satisfy usual achromatic requirements, movable lens components, or the second and third lens components as taught by the invention, must be made from glass material in such manner that for a movable lens component having positive refractive power, any positive lens belonging to such component must be made from a glass material which has as high a $\nu$-value as possible and any negative lens must be made from another glass material which has as low a $\nu$-value as possible. Similarly, for a movable lens component having negative refractive power, the glass material for positive lens or lenses therein should have as low a $\nu$-value as possible, and the glass material for negative lens or lenses therein should have as high a $\nu$-value as possible. However, as shown in FIG. 8 which plotted $\nu$-values of presently available normal optical glasses, represented by Schott denotations, against their ratio of partial dispersion, $\theta$, the ratio $(\theta_1 - \theta_2)/(\nu_1 - \nu_2)$ assumes a substantially constant value. In other words, a greater separation in $\nu$-value results in a correspondingly increased separation in $\theta$-value. Thus it is impossible to obtain such combination of optical glasses from available normal glasses that provides a great separation of $\nu$-values, while permitting to maintain $\theta$-values close to each other.

In order to overcome such difficulty, the invention proposes for the Equation 13 to be satisfied not by all of the lens components, but by only the first lens component. While it may be considered that the above requirements may be achieved by using abnormal dispersion glasses for all of the lens components, the second and third lens components will then have increased refractive power with the result that the curvature of cemented surfaces the rein increases, thereby influencing other monochromatic higher order aberrations incurably and the resulting lens thickness also increases. When abnormal dispersion glasses are used only in the first lens component in accordance with the invention, radius of curvature of cemented surfaces can be chosen large owing to the fact that their refractive power may be kept small for the zoom ratio contemplated in the present invention, thus avoiding adverse influence upon other monochromatic higher order aberrations and permitting to reduce the size of the objective. In this way the invention provides an improved objective which is compact in construction, has a large relative aperture and has secondary chromatic aberration extremely reduced to the extent that achieves a superachromatic condition.

Further details of the invention will be described below using the above given denotations and equations where R is set equal to 4 and assuming, for the sake of simplicity, a system of thin lenses disposed in close contact for the first, second and third lens components.

It is further assumed that in each of the first to third lens components, positive lenses in one lens component are all made from the same glass material as are negative lenses in one less component. Thus, for example, any positive lens in the first lens component is made from a glass material which has a $\nu$-value of $\nu_{1P}$ and a partial dispersion ratio of $\theta_{1P}$, and any negative lens in this component is made from a glass material which has a $\nu$-value of $\nu_{1N}$ and a partial dispersion ratio of $\theta_{1N}$. Denoting the sum of refractive power of all the positive lenses contained in the respective ones of the first to third lens components by $\phi_{1P}$, $\phi_{2P}$ and $\phi_{3P}$, respectively, and denoting the similar sum for all the negative lenses in the respective ones of the first to third lens components by $\phi_{1N}$, $\phi_{2N}$ and $\phi_{3N}$, respectively, axial and lateral primary chromatic aberrations for rays of wavelengths $\lambda$ and $\lambda'$ may be written, using the Equations 1, 2, 3, 5, 6 and 7, as follows:

$$L(\lambda) = h_1^2 \left(\frac{\phi_{1P}}{\nu_{1P}} + \frac{\phi_{1N}}{\nu_{1N}}\right) + h_2^2 \left(\frac{\phi_{2P}}{\nu_{2P}} + \frac{\phi_{2N}}{\nu_{2N}}\right)$$
$$+ h_3^2 \left(\frac{\phi_{3P}}{\nu_{3P}} + \frac{\phi_{3N}}{\nu_{3N}}\right) + h_4^2 \frac{K_4}{V_{\lambda 4}} \quad (14)$$

$$T(\lambda) = H\left\{E_1 h_1^2 \left(\frac{\phi_{1P}}{\nu_{1P}} + \frac{\phi_{1N}}{\nu_{1N}}\right) + E_2 h_2^2 \left(\frac{\phi_{2P}}{\nu_{2P}} + \frac{\phi_{2N}}{\nu_{2N}}\right)\right.$$
$$\left. + E_3 h_3^2 \left(\frac{\phi_{3P}}{\nu_{3P}} + \frac{\phi_{3N}}{\nu_{3N}}\right) + E_4 h_4^2 \frac{K_4}{V_{\lambda 4}}\right\} \quad (15)$$

$$L(\lambda') = h_1^2 \left(\frac{\phi_{1P}}{\nu_{1P}}\theta_{1P} + \frac{\phi_{1N}}{\nu_{1N}}\theta_{1N}\right) + h_2^2 \left(\frac{\phi_{2P}}{\nu_{2P}}\theta_{2P} + \frac{\phi_{2N}}{\nu_{2N}}\theta_{2N}\right)$$
$$+ h_3^2 \left(\frac{\phi_{3P}}{\nu_{3P}}\theta_{3P} + \frac{\phi_{3N}}{\nu_{3N}}\theta_{3N}\right) + h_4^2 \frac{K_4}{V_{\lambda'4}} \quad (16)$$

$$T(\lambda') = H\left\{E_1 h_1^2 \left(\frac{\phi_{1P}}{\nu_{1P}}\theta_{1P} + \frac{\phi_{1N}}{\nu_{1N}}\theta_{1N}\right)\right.$$
$$+ E_2 h_2^2 \left(\frac{\phi_{2P}}{\nu_{2P}}\theta_{2P} + \frac{\phi_{2N}}{\nu_{2N}}\theta_{2N}\right) + E_3 h_3^2 \left(\frac{\phi_{3P}}{\nu_{3P}}\theta_{3P} + \frac{\phi_{3N}}{\nu_{3N}}\theta_{3N}\right)$$
$$\left. + E_4 h_4^2 \frac{K_4}{V_{\lambda'4}}\right\} \quad (17)$$

In order to make $L(\lambda)$ and $T(\lambda)$ null for any focal length of the zoom objective, it follows that $$\frac{\phi_{iP}}{\nu_{iP}} + \frac{\phi_{iN}}{\nu_{iN}} = 0 \text{ for } i=1, 2, 3 \quad (18)$$

$$\frac{1}{V_{\lambda 4}} = 0 \quad (19)$$

These requirements are easily satisfied. Thus using the relationship $$\phi_{iP} + \phi_{iN} = K_i, \text{ for } i=1, 2, 3 \quad (20)$$

glass materials may be chosen which satisfy the following:

$$\phi_{iP} = \frac{\nu_{iP}}{\nu_{iP} - \nu_{iN}} K_i$$

$$\phi_{iN} = \frac{-\nu_{iN}}{\nu_{iP} - \nu_{iN}} K_i$$

for $i=1, 2, 3$. Substitution of this relationship into the Equations 16 and 17 yields $$L(\lambda') = \frac{h_1^2 K_1}{\nu_{1P} - \nu_{1N}}(\theta_{1P} - \theta_{1N}) + \frac{h_2^2 K_2}{\nu_{2P} - \nu_{2N}}(\theta_{2P} - \theta_{2N})$$
$$+ \frac{h_3^2 K_3}{\nu_{3P} - \nu_{3N}}(\theta_{3P} - \theta_{3N}) + \frac{h_4^2 K_4}{V_{\lambda'4}} \quad (22)$$

$$T(\lambda') = H\left\{\frac{E_1 h_1^2 K_1}{\nu_{1P} - \nu_{1N}}(\theta_{1P} - \theta_{1N}) + \frac{E_2 h_2^2 K_2}{\nu_{2P} - \nu_{2N}}\theta_{2P} - \theta_{2N}\right.$$
$$\left. + \frac{E_3 h_3^2 K_3}{\nu_{3P} - \nu_{3N}}(\theta_{3P} - \theta_{3N}) + \frac{E_4 h_4^2 K_4}{V_{\lambda'4}}\right\} \quad (23)$$

In order to make $L(\lambda')$ and $T(\lambda')$ null, it requires that $\theta_{iP} - \theta_{iN} = 0$ for $i=1, 2, 3$ and $1/V_{\lambda'4} = 0$. However, for the reason mentioned previously, it is impossible to achieve this.

According to the invention, provisions are made so that secondary chromatic aberrations resulting from the second and third lens components make compensation for each other, and as to the fourth lens component, a paraxial arrangement is adopted for the zoom objective so as to keep small both the paraxial height $h_4$ and its refractive power $K_4$, thereby making the influence of the secondary chromatic aberration produced by the fourth lens component negligibly small for practical purpose, irrespectively of the value of the equivalent dispersion in the fourth lens component. Finally, with respect to the first lens component only, glass materials are chosen so as to satisfy the equality $$\theta_{1P} = \theta_{1N} \quad (24)$$

In this manner the total axial and lateral chromatic aberrations can be reduced to extremely small values.

The mutual compensation mentioned above can best be understood by consideration of the Equations 22 and 23 for the maximum focal length, since secondary chromatic aberration in a zoom objective generally becomes most eminent at longer focal lengths. When the second and third lens components are arranged to be close to each other at the maximum focal length of the objective so as to achieve the approximation $$h_2 = h_3 \quad (25)$$

and when their refractive power is chosen to satisfy the equality $$K_2 = -K_3 \quad (26)$$

then the equality $E_2 = E_3$ applies, and therefore the Equations 22 and 23 may be rewriten as follows:

$$L(\lambda') = h_1^2 K_1 \frac{\theta_{1P} - \theta_{1N}}{\nu_{1P} - \nu_{1N}} + h_2^2 K_2 \left(\frac{\theta_{2P} - \theta_{2N}}{\nu_{2P} - \nu_{2N}}\right.$$
$$\left. - \frac{\theta_{3P} - \theta_{3N}}{\nu_{3P} - \nu_{3N}}\right) + \frac{h_4^2 K_4}{V_{\lambda'4}} \quad (27)$$

$$T(\lambda') = H\left\{E_1 h_1^2 K_1 \frac{\theta_{1P} - \theta_{1N}}{\nu_{1P} - \nu_{1N}} + E_2 h_2^2 K_2 \left(\frac{\theta_{2P} - \theta_{2N}}{\nu_{2P} - \nu_{2N}}\right.\right.$$
$$\left.\left. - \frac{\theta_{3P} - \theta_{3N}}{\nu_{3P} - \nu_{3N}}\right) + \frac{E_4 h_4^2 K_4}{V_{\lambda'4}}\right\} \quad (28)$$

When $\nu$- and $\theta$-values for the second and third lens components are chosen so as to satisfy the following:

$$\nu_{2P} = \nu_{3N}, \quad \theta_{2P} = \theta_{3N}$$
$$\nu_{2N} = \nu_{3P}, \quad \theta_{2N} = \theta_{3P} \quad (29)$$

the Equations 27 and 28 are reduced to $$L(\lambda') = h_1^2 K_1 \frac{\theta_{1P} - \theta_{1N}}{\nu_{1P} - \nu_{1N}} + \frac{h_4^2 K_4}{V_{\lambda'4}} \quad (30)$$

$$T(\lambda') = H\left\{E_1 h_2^2 K_1 \frac{\theta_{1P} - \theta_{1N}}{\nu_{1P} - \nu_{1N}} + E_4 \frac{h_4^2 K_4}{V_{\lambda'4}}\right\} \quad (31)$$

Thus secondary chromatic aberrations caused by the second and third lens components are completely compensated for and eliminated.

Although it may appear that similar compensation can be achieved by the choice indicated below.

$$\nu_{2P} = \nu_{3P}, \quad \theta_{2P} = \theta_{3P}$$
$$\nu_{2N} = \nu_{3N}, \quad \theta_{2N} = \theta_{3N}$$

such choice is not satisfactory, because achromatic condition for primary chromatic aberration can no longer be maintained.

Then selecting the glass materials for the first lens components such that $\nu_{1P} \neq \nu_{1N}$, but $\theta_{1P} = \theta_{1N}$, and making the term $h_4^2 K_4 / V_{\lambda'4}$ negligibly small for any value of $1/V_{\lambda'4}$ attainable with usual glass material, both $L(\lambda')$ and $T(\lambda')$ can be reduced substantially to hull. In other words, the secondary chromatic aberration can be eliminated without using special or abnormal dispersion glass for the second and third lens components.

In addition, use of identical glass materials, but in different combinations as represented in the Equation 29, in the second and third lens components removes chromatic aberration occurring in these components over the entire region of wavelength for photographic use, with a result comparable to a superachromatic condition. Though chromatic aberrations occurring in the second and third lens components cannot completely compensate for each other at a focal length other than the maximum focal length, secondary chromatic aberation can still be reduced substantially at any focal length by employing the paraxial arrangement as taught by the invention for the zoom objective, that is, by choosing the distribution of refractive power such that $$0.15|K_2| \leq K_1 \leq 0.35|K_2|$$

and $$0.8|K_2| \leq K_3 \leq 1.2|K_2|$$

and by making the second and third lens components to come as close to each other as possible at the maximum focal length. When chromatic aberration in the visible region of the spectrum is to be considered, it is found that the C- and g-lines should be chosen as λ and λ', respectively, for best results. Thus $$\nu_o = \frac{n_F - 1}{n_F - n_o} \text{ and } \theta_{gF} = \frac{n_g - n_F}{n_F - n_o}$$

should be employed.

The above description on the elimination of secondary chromatic aberration is based on the thin lens approximation for the first to third lens components and on the theory of chromatic aberration which applies to the primary chromatic aberration. However, the thin lens approximation applies with good accuracy with respect to the first to third lens components, and because of substantially far less refractive power of such lens components as compared with that of constituent lenses contained in a usual photographic objective, chromatic aberration is little influenced by higher order terms of the aberration expansion, so that the above approach to the elimination of secondary chromatic aberration is applicable with sufficient accuracy.

While the Equations 24, 26 and 29 give the requirements for complete elimination of secondary chromatic aberration occurring in the first to third lens components, it is sufficient to achieve a substantially negligible secondary chromatic aberration or to reduce it to the degree better than that of conventional interchangeable objectives having comparable focal lengths that these equations be replaced by the following in equalities:

$$|\theta_{1P} - \theta_{1N}| \leq 0.05$$

$$0.8|K_2| \leq K_3 \leq 1.2|K_2|$$

$$|\nu_{2P} - \nu_{3N}| \leq 8, \quad |\nu_{2N} - \nu_{3P}| \leq 8$$

$$|\theta_{2P} - \theta_{3N}| \leq 0.02, \quad |\theta_{2N} - \theta_{3P}| \leq 0.02$$

As will be appreciated from the Equations 22 and 23, further reduction of secondary chromatic aberration can be achieved by choosing glass materials so that the difference of ν-value between positive and negative lenses belonging to one lens component may be increased to the extent indicated below.

$$25 \leq \nu_{1P} - \nu_{1N} \leq 45$$

$$30 \leq \nu_{2N} - \nu_{2P} \leq 40$$

$$27 \leq \nu_{3P} - \nu_{3N} \leq 40$$

It has been found that making up each of the first to third lens components in two or three lens groups, respectively, disposed with a very small air gap therebetween serves to improve the accuracy of the thin lens approximation and to reduce the error that is caused by application of the Equations 1 and 2. At the same time, various monochromatic aberrations are favorably corrected.

It has also been found that by dividing each of the first three lens components into two or three lens groups as mentioned above and using a pair of positive and negative, or negative and positive cemented lenses in one or two of these groups, respectively, the radius of curvature of the cemented surface of the respective cemented lenses can be made large, when refractive power $K_{1C}$, $K_{2C}$, and $K_{3C}$ of the cemented lenses in the first, second and third lens components, respectively, satisfy the following inequalities:

$$0.1 K_1 \leq K_{1C} \leq 0.9 K_1$$

$$0.3|K_2| \leq |K_{2C}| \leq 0.7|K_2|$$

$$0.3 K_3 \leq K_{3C} \leq 0.7 K_3$$

in combination with the concurrent requirements:

$$30 \leq \nu_{1N} \leq 50$$

$$25 \leq \nu_{1P} - \nu_{1N} \leq 45$$

$$20 \leq \nu_{2P} \leq 35$$

$$30 \leq \nu_{2N} - \nu_{2P} \leq 40$$

$$20 \leq \nu_{3N} \leq 35$$

$$27 \leq \nu_{3P} - \nu_{3N} \leq 40$$

A larger radius of curvature of each cemented surface reduces the occurrence of higher order chromatic aberration at such surface, thereby contributing to more effective elimination of secondary chromatic aberration.

The invention will be illustrated below by way of examples shown in the drawings, wherein.

Figure 1:
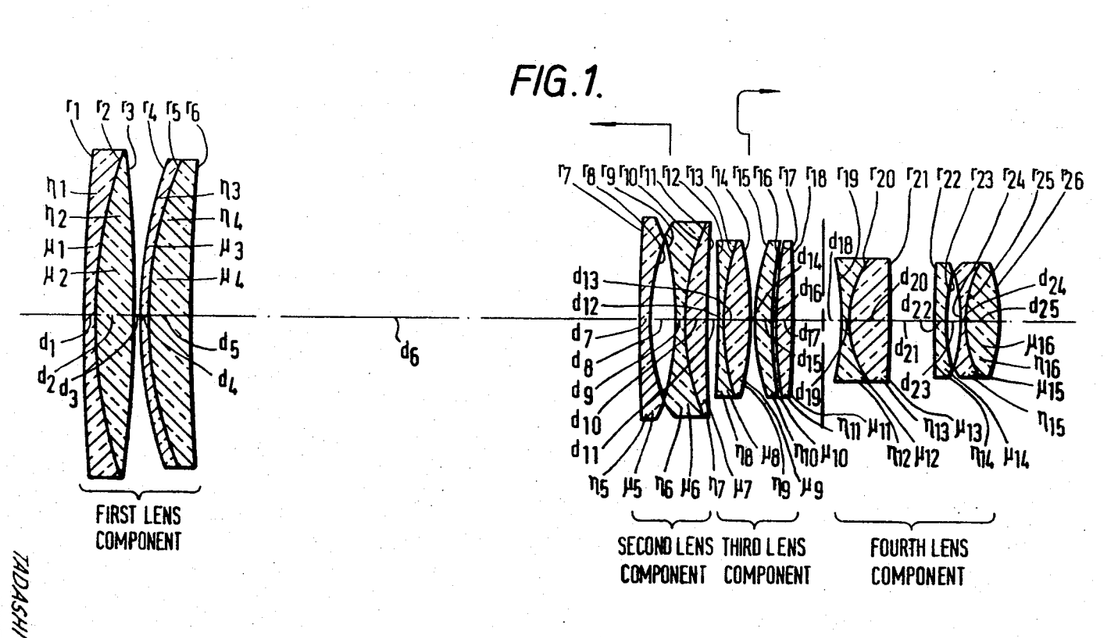
FIG. 1 shows an optical system of the zoom objective according to the invention.
Figure 2:
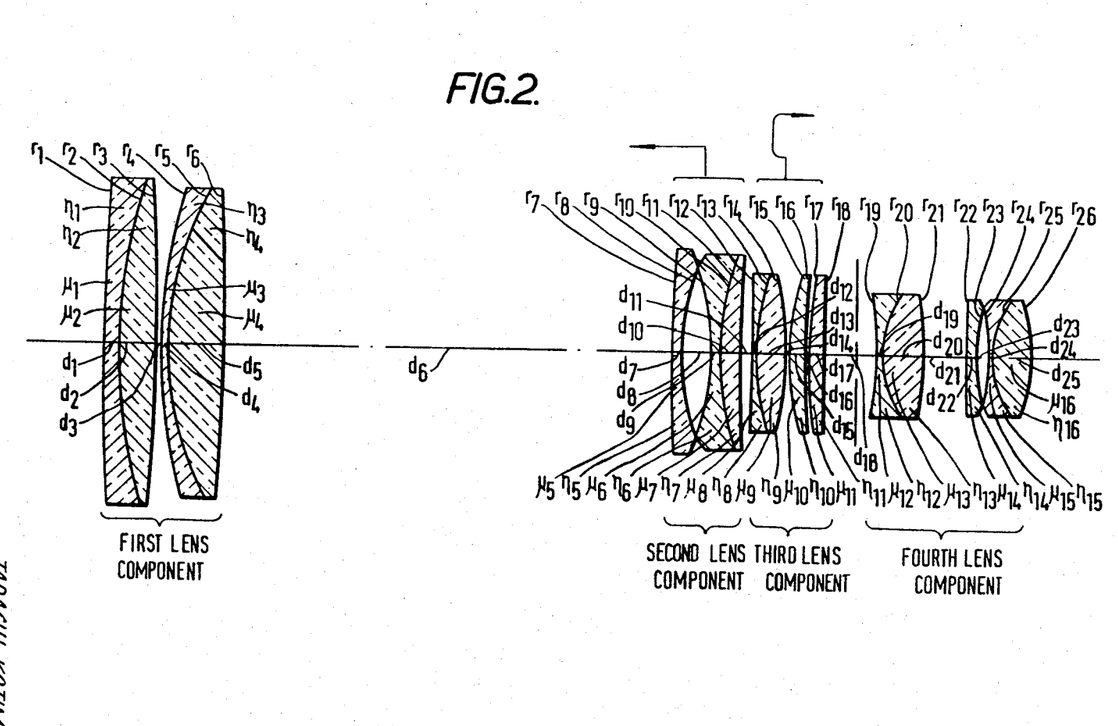
FIG. 2 shows another optical system of the zoom objective according to the invention.

The optical data of the two examples shown in FIGS. 1 and 2 are given in the tables herebelow, where numbering from the front of the objective facing an object being viewed, $K_1$, $K_2$, $K_3$ and $K_4$ denote refractive power of successive lens components, respectively;

$r_1$, $r_2$ ... $r_{26}$ denote radii of curvature of successive refractive surfaces, respectively;

$d_1$, $d_2$ ... $d_{25}$ denote axial separation on the optical axis between successive refractive surfaces, respectively;

$n_1$, $n_2$ ... $n_{16}$ denote refractive indices for the d-line of glass materials from which successive single lens members are made, respectively;

$\nu_1$, $\nu_2$ ... $\nu_{16}$ denote the Abbe number of glass materials from which successive single lens members are made, respectively;

$\nu_{C1}$, $\nu_{C2}$ ... $\nu_{C16}$ denote values for $$\frac{n_F - 1}{n_F - n_C}$$

of glass materials from which successive single lens members are made, respectively; and $\theta_1$, $\theta_2$ ... $\theta_{16}$ denote values for $$\theta_{gF} = \frac{n_g - n_F}{n_F - n_C}$$

of glass materials from which successive single lens members are made, respectively.

EXAMPLE 1

[$K_1=0.00495$, $K_2=-0.0182$, $K_3=0.0200$, $K_4=-0.00581$]

| | | | | | |
|---|---|---|---|---|---|
| $r_1=325.528$ | $d_1=2.8$ | $n_1=1.61310$ | $\nu_1=44.3$ | $\nu_{C1}=45.06$ | $\theta_1=0.5586$ |
| $r_2=125.000$ | $d_2=8.5$ | $n_2=1.48606$ | $\nu_2=81.5$ | $\nu_{C2}=82.11$ | $\theta_2=0.5377$ |
| $r_3=-508.000$ | $d_3=0.1$ | | | | |
| $r_4=129.399$ | $d_4=2.8$ | $n_3=1.61310$ | $\nu_3=44.3$ | $\nu_{C3}=45.06$ | $\theta_3=0.5586$ |
| $r_5=86.560$ | $d_5=9.5$ | $n_4=1.48606$ | $\nu_4=81.5$ | $\nu_{C4}=82.11$ | $\theta_4=0.5377$ |
| $r_6=3967.160$ | $d_6=$variable | | | | |
| $r_7=650.000$ | $d_7=1.8$ | $n_5=1.62041$ | $\nu_5=60.3$ | $\nu_{C5}=60.99$ | $\theta_5=0.5413$ |
| $r_8=61.935$ | $d_8=6.5$ | | | | |
| $r_9=-74.057$ | $d_9=1.8$ | $n_6=1.62041$ | $\nu_6=60.3$ | $\nu_{C6}=60.99$ | $\theta_6=0.5413$ |
| $r_{10}=57.770$ | $d_{10}=5.0$ | $n_7=1.78472$ | $\nu_7=25.7$ | $\nu_{C7}=26.43$ | $\theta_7=0.6153$ |
| $r_{11}=263.500$ | $d_{11}=$variable | | | | |
| $r_{12}=\infty$ | $d_{12}=1.5$ | $n_8=1.80518$ | $\nu_8=25.5$ | $\nu_{C8}=26.17$ | $\theta_8=0.6102$ |
| $r_{13}=52.962$ | $d_{13}=6.8$ | $n_9=1.69350$ | $\nu_9=53.4$ | $\nu_{C9}=54.08$ | $\theta_9=0.5458$ |
| $r_{14}=-76.770$ | $d_{14}=0.1$ | | | | |
| $r_{15}=58.890$ | $d_{15}=4.2$ | $n_{10}=1.62041$ | $\nu_{10}=60.3$ | $\nu_{C10}=60.99$ | $\theta_{10}=0.5413$ |
| $r_{16}=153.160$ | $d_{16}=0.1$ | | | | |
| $r_{17}=95.000$ | $d_{17}=4.2$ | $n_{11}=1.62041$ | $\nu_{11}=60.3$ | $\nu_{C11}=60.99$ | $\theta_{11}=0.5413$ |
| $r_{18}=\infty$ | $d_{18}=$variable | | | | |
| $r_{19}=-61.700$ | $d_{19}=1.5$ | $n_{12}=1.78305$ | $\nu_{12}=36.1$ | $\nu_{C12}=36.84$ | $\theta_{12}=0.5847$ |
| $r_{20}=24.128$ | $d_{20}=9.3$ | $n_{13}=1.78472$ | $\theta_{13}=25.7$ | $\nu_{C13}=26.43$ | $\theta_{13}=0.6153$ |
| $r_{21}=-131.500$ | $d_{21}=9.5$ | | | | |
| $r_{22}=277.768$ | $d_{22}=2.0$ | $n_{14}=1.88300$ | $\nu_{14}=41.0$ | $\nu_{C14}=41.73$ | $\theta_{14}=0.5660$ |
| $r_{23}=45.442$ | $d_{23}=3.0$ | | | | |
| $r_{24}=-105.450$ | $d_{24}=1.5$ | $n_{15}=1.57501$ | $\nu_{15}=41.3$ | $\nu_{C15}=42.01$ | $\theta_{15}=0.5740$ |
| $r_{25}=24.674$ | $d_{25}=8.0$ | $n_{16}=1.60881$ | $\nu_{16}=58.9$ | $\nu_{C16}=59.58$ | $\theta_{16}=0.5455$ |
| $r_{26}=-35.570$ | | | | | | where $d_6$, $d_{11}$ and $d_{18}$ assume the following values in dependence upon focal lengths, $f$, involved:

| $f$ | $d_6$ | $d_{11}$ | $d_{18}$ |
|---|---|---|---|
| 58.82 | 2.696 | 103.980 | 5.743 |
| 219.68 | 77.496 | 19.103 | 15.819 |
| 308.31 | 100.812 | 0.765 | 9.957 |

EXAMPLE 2

[$K_1=0.00495$, $K_2=0.0182$, $K_3=0.0200$, $K_4=-0.00581$]

| | | | | | |
|---|---|---|---|---|---|
| $r_1=630.000$ | $d_1=2.8$ | $n_1=1.61340$ | $\nu_1=43.9$ | $\nu_{C1}=44.61$ | $\theta_1=0.5633$ |
| $r_2=119.340$ | $d_2=9.0$ | $n_2=1.48749$ | $\nu_2=70.0$ | $\nu_{C2}=70.73$ | $\theta_2=0.5273$ |
| $r_3=-481.820$ | $d_3=0.1$ | | | | |
| $r_4=114.000$ | $d_4=2.8$ | $n_3=1.61340$ | $\nu_3=43.9$ | $\nu_{C3}=44.61$ | $\theta_3=0.5633$ |
| $r_5=73.112$ | $d_5=11.5$ | $n_4=1.48749$ | $\nu_4=70.0$ | $\nu_{C4}=70.73$ | $\theta_4=0.5273$ |
| $r_6=-1,323.000$ | $d_6=$variable | | | | |
| $r_7=650.000$ | $d_7=1.8$ | $n_5=1.62041$ | $\nu_5=60.3$ | $\nu_{C5}=60.99$ | $\theta_5=0.5413$ |
| $r_8=61.935$ | $d_8=6.5$ | | | | |
| $r_9=-74.057$ | $d_9=1.8$ | $n_6=1.62041$ | $\nu_6=60.3$ | $\nu_{C6}=60.99$ | $\theta_6=0.5413$ |
| $r_{10}=57.770$ | $d_{10}=5.0$ | $n_7=1.78472$ | $\nu_7=25.7$ | $\nu_{C7}=26.43$ | $\theta_7=0.6153$ |
| $r_{11}=263.500$ | $d_{11}=$variable | | | | |
| $r_{12}=\infty$ | $d_{12}=1.5$ | $n_8=1.80518$ | $\nu_8=25.5$ | $\nu_{C8}=26.17$ | $\theta_8=0.6102$ |
| $r_{13}=52.962$ | $d_{13}=6.8$ | $n_9=1.69350$ | $\nu_9=53.4$ | $\nu_{C9}=54.08$ | $\theta_9=0.5458$ |
| $r_{14}=-76.770$ | $d_{14}=0.1$ | | | | |
| $r_{15}=58.890$ | $d_{15}=4.2$ | $n_{10}=1.62041$ | $\nu_{10}=60.3$ | $\nu_{C10}=60.99$ | $\theta_{10}=0.5413$ |
| $r_{16}=153.160$ | $d_{16}=0.1$ | | | | |
| $r_{17}=95.00$ | $d_{17}=4.2$ | $n_{11}=1.62041$ | $\nu_{11}=60.3$ | $\nu_{C11}=60.99$ | $\theta_{11}=0.5413$ |
| $r_{18}=\infty$ | | | | | |

EXAMPLE 2—Continued

| | | | | | |
|---|---|---|---|---|---|
| $r_{19}=-61.200$ | $d_{18}=$variable | | | | |
| $r_{20}=23.715$ | $d_{19}=1.5$ | $n_{12}=1.78305$ | $\nu_{12}=36.1$ | $\nu_{C12}=36.84$ | $\theta_{12}=0.5847$ |
| $r_{21}=-131.500$ | $d_{20}=9.3$ | $n_{13}=1.78472$ | $\nu_{13}=25.7$ | $\nu_{C13}=26.43$ | $\theta_{13}=0.6153$ |
| $r_{22}=259.500$ | $d_{21}=9.5$ | | | | |
| $r_{23}=45.656$ | $d_{22}=2.0$ | $n_{14}=1.88300$ | $\nu_{14}=41.0$ | $\nu_{C14}=41.73$ | $\theta_{14}=0.5660$ |
| $r_{24}=102.046$ | $d_{23}=3.0$ | | | | |
| $r_{25}=24.808$ | $d_{24}=1.5$ | $n_{15}=1.57501$ | $\nu_{15}=41.3$ | $\nu_{C15}=42.01$ | $\theta_{15}=0.5740$ |
| $r_{26}=-35.372$ | $d_{25}=8.0$ | $n_{16}=1.60729$ | $\nu_{16}=59.5$ | $\nu_{C16}=60.23$ | $\theta_{16}=0.5431$ |

| $f$ | $d_6$ | $d_{11}$ | $d_{18}$ |
|---|---|---|---|
| 58.82 | 2.696 | 103.980 | 5.743 |
| 219.68 | 77.496 | 19.103 | 15.819 |
| 308.25 | 101.696 | 0.765 | 9.957 |

Using the arrangement of lens components as shown in the drawing, a zoom objective has been constructed according to the following example:

EXAMPLE 3

[$K_1=0.00495$, $K_2=-0.0182$, $K_3=0.0200$, $K_4=-0.00581$]

| | | | | | |
|---|---|---|---|---|---|
| $r_1=441.186$ | $d_1=2.8$ | $n_1=1.65332$ | $\nu_1=39.7$ | $\nu_{C1}=40.42$ | $\theta_1=0.5690$ |
| $r_2=146.360$ | $d_2=8.5$ | $n_2=1.48749$ | $\nu_2=70.0$ | $\nu_{C2}=71.14$ | $\theta_2=0.5289$ |
| $r_3=-408.315$ | $d_3=0.1$ | | | | |
| $r_4=116.051$ | $d_4=2.8$ | $n_3=1.65332$ | $\nu_3=39.7$ | $\nu_{C3}=40.42$ | $\theta_3=0.5690$ |
| $r_5=78.380$ | $d_5=9.5$ | $n_4=1.48749$ | $\nu_4=70.0$ | $\nu_{C4}=71.14$ | $\theta_4=0.5289$ |
| $r_6=4{,}289.934$ | $d_6=$variable | | | | |
| $r_7=650.00$ | $d_7=1.8$ | $n_5=1.62041$ | $\nu_5=60.3$ | $\nu_{C5}=60.99$ | $\theta_5=0.5413$ |
| $r_8=61.935$ | $d_8=6.5$ | | | | |
| $r_9=-74.057$ | $d_9=1.8$ | $n_6=1.62041$ | $\nu_6=60.3$ | $\nu_{C6}=60.99$ | $\theta_6=0.5413$ |
| $r_{10}=57.770$ | $d_{10}=5.0$ | $n_7=1.78472$ | $\nu_7=25.7$ | $\nu_{C7}=26.43$ | $\theta_7=0.6153$ |
| $r_{11}=263.500$ | $d_{11}=$variable | | | | |
| $r_{12}=\infty$ | $d_{12}=1.5$ | $n_8=1.80518$ | $\nu_8=25.5$ | $\nu_{C8}=26.17$ | $\theta_8=0.6102$ |
| $r_{13}=52.962$ | $d_{13}=6.8$ | $n_9=1.69350$ | $\nu_9=53.4$ | $\nu_{C9}=54.08$ | $\theta_9=0.5458$ |
| $r_{14}=-76.770$ | $d_{14}=0.1$ | | | | |
| $r_{15}=58.890$ | $d_{15}=4.2$ | $n_{10}=1.62041$ | $\nu_{10}=60.3$ | $\nu_{C10}=60.99$ | $\theta_{10}=0.5413$ |
| $r_{16}=153.160$ | $d_{16}=0.1$ | | | | |
| $r_{17}=95.000$ | $d_{17}=4.2$ | $n_{11}=1.62041$ | $\nu_{11}=60.3$ | $\nu_{C11}=60.99$ | $\theta_{11}=0.5413$ |
| $r_{18}=\infty$ | $d_{18}=$variable | | | | |
| $r_{19}=-61.700$ | $d_{19}=1.5$ | $n_{12}=1.78305$ | $\nu_{12}=36.1$ | $\nu_{C12}=36.84$ | $\theta_{12}=0.5847$ |
| $r_{20}=24.128$ | $d_{20}=9.3$ | $n_{13}=1.78472$ | $\nu_{13}=25.7$ | $\nu_{C13}=26.43$ | $\theta_{13}=0.6153$ |
| $r_{21}=-131.500$ | $d_{21}=9.5$ | | | | |
| $r_{22}=277.768$ | $d_{22}=2.0$ | $n_{14}=1.88300$ | $\nu_{14}=41.0$ | $\nu_{C14}=41.73$ | $\theta_{14}=0.5660$ |
| $r_{23}=45.442$ | $d_{23}=3.0$ | | | | |
| $r_{24}=-105.450$ | $d_{24}=1.5$ | $n_{15}=1.57501$ | $\nu_{15}=41.3$ | $\nu_{C15}=42.01$ | $\nu_{15}=0.5740$ |
| $r_{25}=24.674$ | $d_{25}=8.0$ | $n_{16}=1.60881$ | $\nu_{16}=58.9$ | $\nu_{C16}=60.23$ | $\theta_{16}=0.5431$ |
| $r_{26}=-35.570$ | | | | | | where $d_6$, $d_{11}$ and $d_{18}$ assume the following values in dependence upon focal lengths, $f$, involved:

| $f$ | $d_6$ | $d_{11}$ | $d_{18}$ |
|---|---|---|---|
| 58.82 | 2,442 | 103.980 | 5.743 |
| 219.68 | 77.242 | 19.103 | 15.819 |
| 308.25 | 101.442 | 0.765 | 9.957 |

Figure 3A:
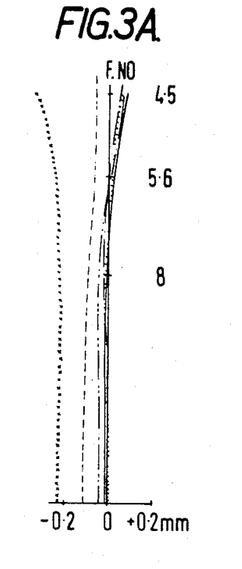
FIGS. 3A, 3B, 3C and FIGS. 4A, 4B, 4C show spherical aberration of two examples shown in FIGS. 1 and 2, respectively, for rays of various wavelengths and at different focal lengths.
Figure 3B:
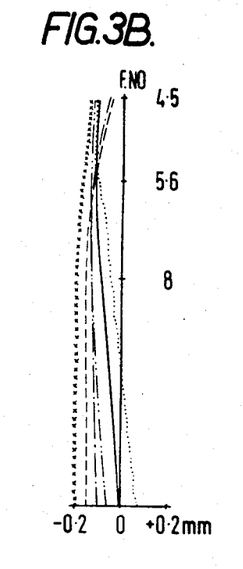
Figure 3C:
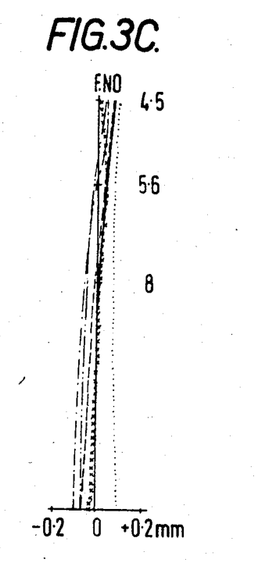

FIGS. 3 to 7 show various aberrations observed with the zoom objectives constructed according to the above examples. Of these, each figure accompanying the letter A shows aberration of the zoom objective according to Example 1 and each figure accompanying the letter B shows aberration of the zoom objective according to Example 2. In addition, curves or sets of curves designated by small letters $a$, $b$ and $c$, respectively, correspond to three different focal lengths of 308.31, 219.68 and 58.82 mm., respectively In FIGS. 3A and 3B, spherical aberration for various wavelengths are drawn in accordance with the following representation scheme:

Solid line (—) ______________________ For the $d$-line.
Broken lines (– – –) _________________ For the $g$-line.
Crosses (x x x) _____________________ For the $h$-line.
Single dot chain line (– · –) ___________ For the F-line.
Double dot chain line (– · · –) ________ For the $e$-line.
Dotted lines (· · · · ·) ________________ For the C-line.

Figure 4A:
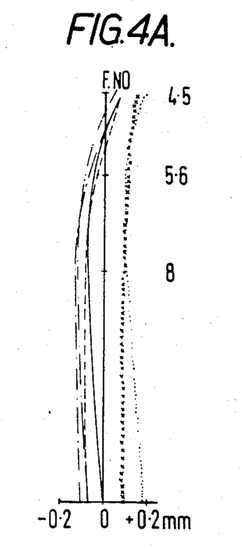
Figure 4B:
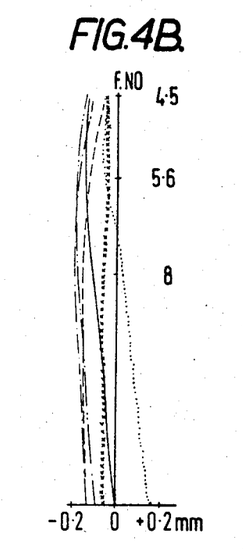
Figure 4C:
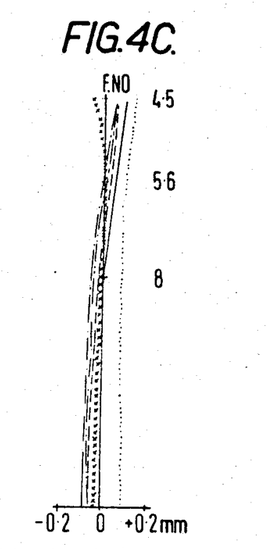
Figures 5A, 5B:
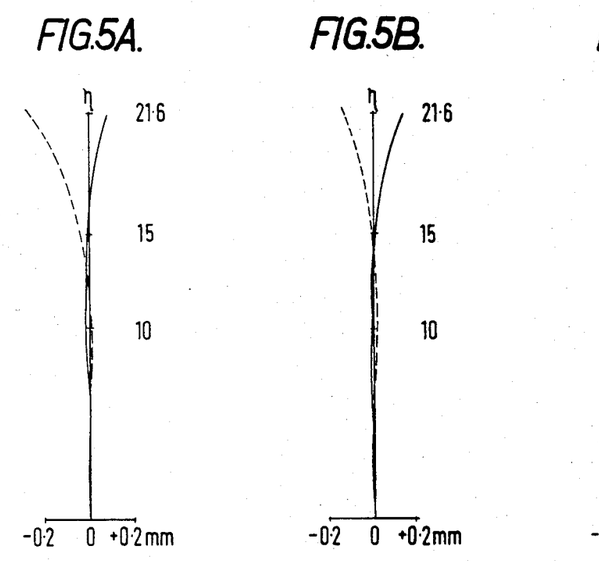
FIGS. 5A and 5B show distortion of the two examples, respectively.
Figure 5C:
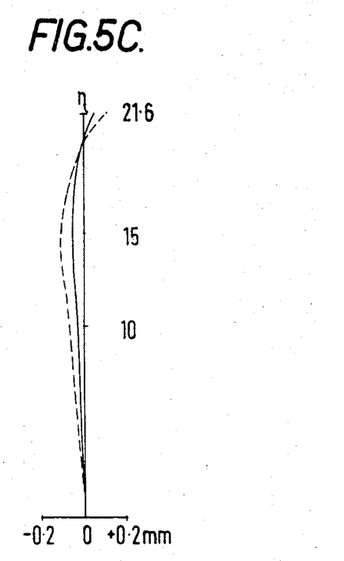
Figures 6A, 6B:
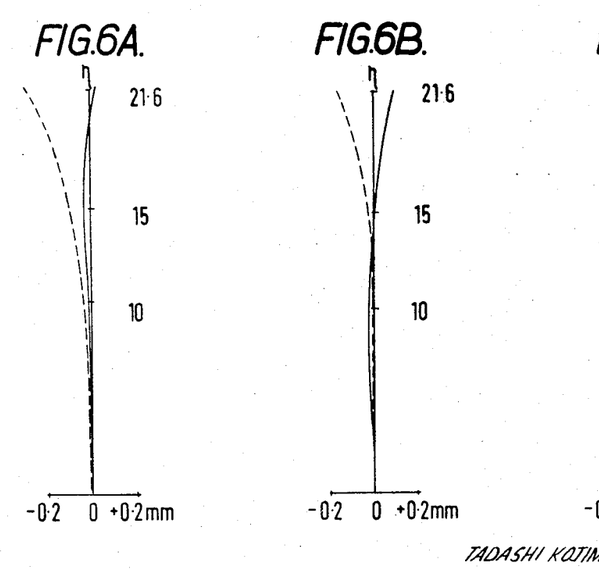
Figure 6C:
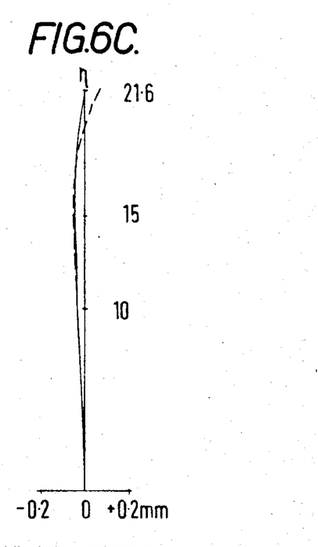
Figure 7A:
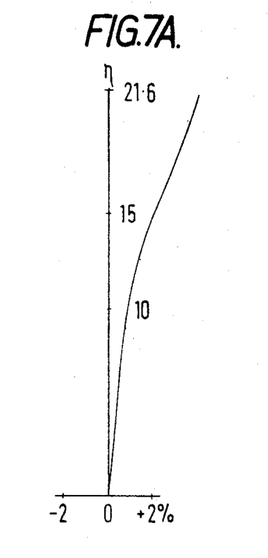
FIGS. 7A, 7B, 7C and FIGS. 8A, 8B, 8C show astigmatism of the two examples, respectively.
Figure 7B:
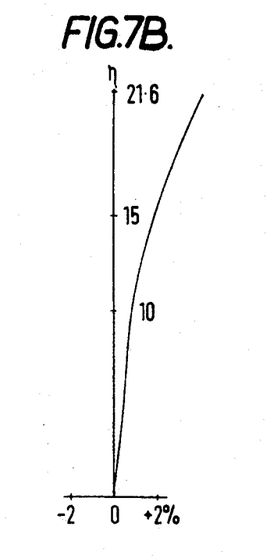
Figure 7C:
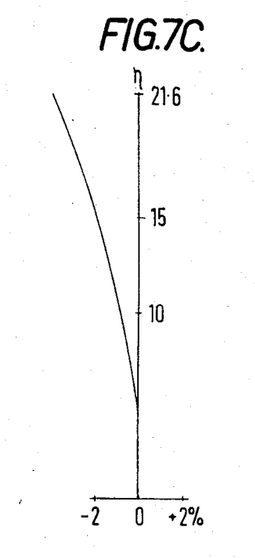

The same representation scheme is used also in FIGS. 7A and 7B which show lateral chromatic aberration of a principal ray. In FIGS. 4A and 4B, curves drawn in solid line show curvature of image field in the sagittal plane and curves drawn in broken lines show curvature of image field in the meridional plane. FIGS. 5A and 5B show distortion. FIGS. 6A and 6B show axial chromatic aberration plotted against wavelength λ in unit of millimicrometers. The denotation $\eta$ on the ordinate of FIGS. 4, 5 and 7 represents an image height. It will be appreciated that all of the aberrations are well corrected at different focal lengths. In particular, both axial and lateral chromatic aberrations are very favorably eliminated, and comatic flare is also minimized. Aberrations, particularly, axial and lateral chromatic aberrations of the zoom objective according to Example 3 were substantially similar to those for Example 2.

Thus it will be understood that the invention has provided a zoom objective having high zoom ratio in a region between the standard and longer focal lengths in which aberrations are favorably corrected including secondary chromatic aberration and which is compact in construction. Axial and lateral chromatic aberrations are corrected in the zoom objective of the invention to a higher degree than in conventional interchangeable objectives, particularly for a range of focal length between 200 and 300 mm. Superachromatic correction is possible when a combination of optical glasses is used which reduces the difference $\theta_{1P}-\theta_{1N}$ substantially to null. The zoom objective still has a telephoto ratio of exactly 1.0 at the maximum focal length. The term telephoto ratio is defined herein as the whole length of the objective to the focal length, where the term whole length is intended to mean the distance between the image plane and the front surface of the objective. Thus the zoom objective of the invention has a compact construction.

Having described the invention, what is claimed is:

1. A zoom objective comprising four lens components arranged on a common optical axis, first and third lens components each having positive refractive power, and second and fourth lens components each having negative refractive power, said second lens component being movable on the optical axis between said first and third lens components to vary the focal length of the whole system, said third lens component being movable on the optical axis so as to keep the final image position of the objective stationary, said second and third lens components being very closely spaced from each other for a maximum focal length, a stop being disposed at a fixed position between said third and fourth lens components, wherein denoting refractive power of said first, second and third lens components by $K_1$, $K_2$ and $K_3$, respectively, the following inequalities apply:

$$0.15|K_2| \leq K_1 \leq 0.35|K_2|$$
$$0.8|K_2| \leq K_3 \leq 1.2|K_2|$$

and wherein denoting the inverse of dispersive power for the C-line by $\nu_C$, denoting ratio of partial dispersion for the $g$- and F-lines by $\theta_{gF}$, thus $$\nu_C = \frac{n_F - 1}{n_F - n_C} \text{ and } \theta_{gF} = \frac{n_g - n_F}{n_F - n_C}$$

where $n_C$, $n_F$ and $n_g$ denote refractive indices for the C-, F- and g-lines, respectively, of the glass from which an associated lens member is made, and denoting $\nu_C$- and $\theta_{gF}$-values of any positive lens member in the first lens component by $\nu_{1P}$ and $\theta_{1P}$, respectively, denoting $\nu_C$- and $\theta_{gF}$-values of any negative lens member in the first lens component by $\nu_{1N}$ and $\theta_{1N}$, respectively, and similarly using denotations $\nu_{2P}$, $\theta_{2P}$ and $\nu_{2N}$, $\theta_{2N}$ for any positive lens member and for any negative lens member in the second lens component, respectively, and similarly using denotations $\nu_{3P}$, $\theta_{3P}$ and $\nu_{3N}$, $\theta_{3N}$ for any positive lens member and for any negative lens member in the third lens component, respectively, the following inequalities apply:

$$|\theta_{1P} - \theta_{1N}| \leq 0.05$$
$$|\nu_{2P} - \nu_{3N}| \leq 8$$
$$|\theta_{2P} - \theta_{3N}| \leq 0.02$$
$$|\nu_{2N} - \nu_{3P}| \leq 8$$
$$|\theta_{2N} - \theta_{3P}| \leq 0.02$$
$$25 \leq \nu_{1P} - \nu_{1N} \leq 45$$
$$30 \leq \nu_{2N} - \nu_{2P} \leq 40$$
$$27 \leq \nu_{3P} - \nu_{3N} \leq 40$$

2. A zoom objective of which optical data is given by the table herebelow wherein numbering from the front of the objective facing an object being viewed, $K_1$, $K_2$, $K_3$ and $K_4$ denote refractive power of successive lens components, respectively, $r_1$, $r_2$ ... $r_{26}$ denote radii of curvature of successive refractive surfaces, respectively, $d_1$, $d_2$ ... $d_{25}$ denote axial separation on the optical axis between successive refractive surfaces, respectively, $n_1$, $n_2$ ... $n_{16}$, $\nu_1$, $\nu_2$ ... $\nu_{16}$; $\nu_{C1}$, $\nu_{C2}$ ... $\nu_{C16}$; and $\theta_1$, $\theta_2$ ... $\theta_{16}$ denote refractive indices for the d-line, the Abbe number, $$\frac{n_F - 1}{n_F - n_C}$$

values and $$\frac{n_g - n_F}{n_F - n_C}$$

values, respectively, of glass materials from which successive single lens members are made, respectively, $[K_1=0.00495, K_2=-0.0182, K_3=0.0200, K_4=-0.00581]$

| | | | | | |
|---|---|---|---|---|---|
| $r_1=325.528$ | $d_1=2.8$ | $n_1=1.61310$ | $\nu_1=44.3$ | $\nu_{C1}=45.06$ | $\theta_1=0.5586$ |
| $r_2=125.000$ | $d_2=8.5$ | $n_2=1.48606$ | $\nu_2=81.5$ | $\nu_{C2}=82.11$ | $\theta_2=0.5377$ |
| $r_3=-508.000$ | $d_3=0.1$ | | | | |
| $r_4=129.399$ | $d_4=2.8$ | $n_3=1.61310$ | $\nu_3=44.3$ | $\nu_{C3}=45.06$ | $\theta_3=0.5586$ |
| $r_5=86.560$ | $d_5=9.5$ | $n_4=1.48606$ | $\nu_4=81.5$ | $\nu_{C4}=82.11$ | $\theta_4=0.5377$ |
| $r_6=3697.160$ | $d_6=$variable | | | | |
| $r_7=650.000$ | $d_7=1.8$ | $n_5=1.62041$ | $\nu_5=60.3$ | $\nu_{C5}=60.99$ | $\theta_5=0.5413$ |
| $r_8=61.935$ | $d_8=6.5$ | | | | |
| $r_9=-74.057$ | $d_9=1.8$ | $n_6=1.62041$ | $\nu_6=60.3$ | $\nu_{C6}=60.99$ | $\theta_6=0.5413$ |
| $r_{10}=57.770$ | $d_{10}=5.0$ | $n_7=1.78472$ | $\nu_7=25.7$ | $\nu_{C7}=26.43$ | $\theta_7=0.6153$ |
| $r_{11}=263.500$ | $d_{11}=$variable | | | | |
| $r_{12}=\infty$ | $d_{12}=1.5$ | $n_8=1.80518$ | $\nu_8=25.5$ | $\nu_{C8}=26.17$ | $\theta_8=0.6102$ |
| $r_{13}=52.962$ | $d_{13}=6.8$ | $n_9=1.69350$ | $\nu_9=53.4$ | $\nu_{C9}=54.08$ | $\theta_9=0.5458$ |
| $r_{14}=-76.770$ | $d_{14}=0.1$ | | | | |
| $r_{15}=58.890$ | $d_{15}=4.2$ | $n_{10}=1.62041$ | $\nu_{10}=60.3$ | $\nu_{C10}=60.99$ | $\theta_{10}=0.5413$ |
| $r_{16}=153.160$ | $d_{16}=0.1$ | | | | |
| $r_{17}=95.000$ | $d_{17}=4.2$ | $n_{11}=1.62041$ | $\nu_{11}=60.3$ | $\nu_{C11}=60.99$ | $\theta_{11}=0.541$ |
| $r_{18}=\infty$ | $d_{18}=$variable | | | | |
| $r_{19}=-61.700$ | $d_{19}=1.5$ | $n_{12}=1.78305$ | $\nu_{12}=36.1$ | $\nu_{C12}=36.84$ | $\theta_{12}=0.5847$ |
| $r_{20}=24.128$ | $d_{20}=9.3$ | $n_{13}=1.78472$ | $\nu_{13}=25.7$ | $\nu_{C13}=26.43$ | $\theta_{13}=0.6153$ |
| $r_{21}=-131.500$ | $d_{21}=9.5$ | | | | |
| $r_{22}=277.768$ | $d_{22}=2.0$ | $n_{14}=1.88300$ | $\nu_{14}=41.0$ | $\nu_{C14}=41.73$ | $\theta_{14}=0.5660$ |
| $r_{23}=45.442$ | $d_{23}=3.0$ | | | | |
| $r_{24}=-105.450$ | $d_{24}=1.5$ | $n_{15}=1.57501$ | $\nu_{15}=41.3$ | $\nu_{C15}=42.01$ | $\theta_{15}=0.5740$ |
| $r_{25}=24.674$ | $d_{25}=8.0$ | $n_{16}=1.60881$ | $\nu_{16}=58.9$ | $\nu_{C16}=59.58$ | $\theta_{16}=0.5455$ |
| $r_{26}=-35.570$ | | | | | | where $d_6$, $d_{11}$ and $d_{18}$ assume the following values in dependence upon focal lengths, $f$, involved:

| $f$ | $d_6$ | $d_{11}$ | $d_{18}$ |
|---|---|---|---|
| 58.82 | 2.696 | 103.080 | 5.743 |
| 219.68 | 77.406 | 10.103 | 15.819 |
| 308.31 | 100.812 | 0.765 | 9.957 |

3. A zoom objective of which optical data is given by the table hereinbelow wherein $K_1$, $K_2$, $K_3$ and $K_4$ denote refractive power of successive lens components, respectively, $r_1$, $r_2$ ... $r_{26}$ denote radii of curvature of successive refractive surfaces, respectively, $d_1$, $d_2$ ... $d_{25}$ denote axial separation on the optical axis between successive refractive surfaces, respectively, $n_1$, $n_2$ ... $n_{16}$; $\nu_1$, $\nu_2$ ... $\nu_{16}$; $\nu_{C1}$, $\nu_{C2}$ ... $\nu_{C16}$; and $\theta_1$, $\theta_2$ ... $\theta_{16}$ denote refractive indices for the d-line, Abbe number, $$\frac{n_F-1}{n_F-n_C}$$

values and $$\frac{n_g-n_F}{n_F-n_C}$$

values, respectively, of glass materials from which successive single lens members are made, respectively,

[$K_1=0.00495$, $K_2=-0.0182$, $K_3=0.0200$, $K_4=-0.00581$]

| | | | | | |
|---|---|---|---|---|---|
| $r_1=630.000$ | $d_1=2.8$ | $n_1=1.61340$ | $\nu_1=43.9$ | $\nu_{C1}=44.61$ | $\theta_1=0.5633$ |
| $r_2=119.340$ | $d_2=9.0$ | $n_2=1.48749$ | $\nu_2=70.0$ | $\nu_{C2}=70.73$ | $\theta_2=0.5273$ |
| $r_3=-481.820$ | $d_3=0.1$ | | | | |
| $r_4=114.000$ | $d_4=2.8$ | $n_3=1.61340$ | $\nu_3=43.9$ | $V_{C3}=44.61$ | $\theta_3=0.5633$ |
| $r_5=73.112$ | $d_5=11.5$ | $n_4=1.48749$ | $\nu_4=70.0$ | $\nu_{C4}=70.73$ | $\theta_4=0.5273$ |
| $r_6=-1323.000$ | $d_6$=variable | | | | |
| $r_7=650.000$ | $d_7=1.8$ | $n_5=1.62041$ | $\nu_5=60.3$ | $\nu_{C5}=60.99$ | $\theta_5=0.5413$ |
| $r_8=61.935$ | $d_8=6.5$ | | | | |
| $r_9=-74.057$ | $d_9=1.8$ | $n_6=1.62041$ | $\nu_6=60.3$ | $\nu_{C6}=60.99$ | $\theta_6=0.5413$ |
| $r_{10}=57.770$ | $d_{10}=5.0$ | $n_7=1.78472$ | $\nu_7=25.7$ | $\nu_{C7}=26.43$ | $\theta_7=0.6153$ |
| $r_{11}=263.500$ | $d_{11}$=variable | | | | |
| $r_{12}=\infty$ | $d_{12}=1.5$ | $n_8=1.80518$ | $\nu_8=25.5$ | $\nu_{C8}=26.17$ | $\theta_8=0.6102$ |
| $r_{13}=52.962$ | $d_{13}=6.8$ | $n_9=1.69350$ | $\nu_9=53.4$ | $\nu_{C9}=54.08$ | $\theta_9=0.5458$ |
| $r_{14}=-76.770$ | $d_{14}=0.1$ | | | | |
| $r_{15}=58.890$ | $d_{15}=4.2$ | $n_{10}=1.62041$ | $\nu_{10}=60.3$ | $\nu_{C10}=60.99$ | $\theta_{10}=0.5413$ |
| $r_{16}=153.160$ | $d_{16}=0.1$ | | | | |
| $r_{17}=95.000$ | $d_{17}=4.2$ | $n_{11}=1.62041$ | $\nu_{11}=60.3$ | $\nu_{C11}=60.99$ | $\theta_{11}=0.5413$ |
| $r_{18}=\infty$ | $d_{18}$=variable | | | | |
| $r_{19}=-61.200$ | $d_{19}=1.5$ | $n_{12}=1.78305$ | $\nu_{12}=36.1$ | $\nu_{C12}=63.84$ | $\theta_{12}=0.5847$ |
| $r_{20}=23.715$ | $d_{20}=9.3$ | $n_{13}=1.78472$ | $\nu_{13}=25.7$ | $\nu_{C13}=26.43$ | $\theta_{13}=0.6153$ |
| $r_{21}=-131.500$ | $d_{21}=9.5$ | | | | |
| $r_{22}=259.500$ | $d_{22}=2.0$ | $n_{14}=1.88300$ | $\nu_{14}=41.0$ | $\nu_{C14}=41.73$ | $\theta_{14}=0.5660$ |
| $r_{23}=45.656$ | $d_{23}=3.0$ | | | | |
| $r_{24}=-102.046$ | $d_{24}=1.5$ | $n_{15}=1.57501$ | $\nu_{15}=41.3$ | $\nu_{C15}=42.01$ | $\theta_{15}=0.5740$ |
| $r_{25}=24.808$ | $d_{25}=8.0$ | $n_{16}=1.60729$ | $\nu_{16}=59.5$ | $\nu_{C16}=60.23$ | $\theta_{16}=0.5431$ |
| $r_{26}=-35.372$ | | | | | |

| $f$ | $d_6$ | $d_{11}$ | $d_{18}$ |
|---|---|---|---|
| 58.82 | 2.696 | 103.980 | 5.743 |
| 219.68 | 77.496 | 19.103 | 15.819 |
| 308.25 | 101.696 | 0.765 | 9.957 |

4. A zoom objective of which optical data is given by the table herebelow wherein $K_1$, $K_2$, $K_3$ and $K_4$ denote refractive power of successive lens components, respectively, $r_1$, $r_2$ ... $r_{26}$ denote radii of curvature of successive refractive surfaces, respectively, $d_1$, $d_2$ ... $d_{25}$ denote axial separation on the optical axis between successive refractive surfaces, respectively, $n_1$, $n_2$ ... $n_{16}$; $\nu_1$, $\nu_2$ ... $\nu_{16}$; $\nu_{C1}$, $\nu_{C2}$ ... $\nu_{C16}$; and $\theta_1$, $\theta_2$, ... $\theta_{16}$ denote refractive indices for the $d$-line, the Abbe number, $$\frac{n_F-1}{n_F-n_C} \text{ values and } \frac{n_g-n_F}{n_F-n_C}$$

values, respectively, of glass materials from which successive single lens members are made, respectively,

[$K_1=0.00495$, $K_2=-0.0182$, $K_3=0.0200$, $K_4=-0.00581$]

| | | | | | |
|---|---|---|---|---|---|
| $r_1=441.186$ | $d_1=2.8$ | $n_1=1.65332$ | $\nu_1=39.7$ | $\nu_{C1}=40.42$ | $\theta_1=0.5690$ |
| $r_2=146.360$ | $d_2=8.5$ | $n_2=1.48749$ | $\nu_2=70.0$ | $\nu_{C2}=71.14$ | $\theta_2=0.5289$ |
| $r_3=-408.315$ | $d_3=0.1$ | | | | |
| $r_4=116.051$ | $d_4=2.8$ | $n_3=1.65332$ | $\nu_3=39.7$ | $\nu_{C3}=40.42$ | $\theta_3=0.5690$ |
| $r_5=78.380$ | $d_5=9.5$ | $n_4=1.48749$ | $\nu_4=70.0$ | $\nu_{C4}=71.14$ | $\theta_4=0.5289$ |
| $r_6=4289.934$ | $d_6=$variable | | | | |
| $r_7=650.00$ | $d_7=1.8$ | $n_5=1.62041$ | $\nu_5=60.3$ | $\nu_{C5}=60.99$ | $\theta_5=0.5413$ |
| $r_8=61.935$ | $d_8=6.5$ | | | | |
| $r_9=-74.057$ | $d_9=1.8$ | $n_6=1.62041$ | $\nu_6=60.3$ | $\nu_{C6}=60.99$ | $\theta_6=0.5413$ |
| $r_{10}=57.770$ | $d_{10}=5.0$ | $n_7=1.78472$ | $\nu_7=25.7$ | $\nu_{C7}=26.43$ | $\theta_7=0.6153$ |
| $r_{11}=263.500$ | $d_{11}=$variable | | | | |
| $r_{12}=\infty$ | $d_{12}=1.5$ | $n_8=1.80518$ | $\nu_8=25.5$ | $\nu_{C8}=26.17$ | $\theta_8=0.6102$ |
| $r_{13}=52.962$ | $d_{13}=6.8$ | $n_9=1.69350$ | $\nu_9=53.4$ | $\nu_{C9}=54.08$ | $\theta_9=0.5458$ |
| $r_{14}=-76.770$ | $d_{14}=0.1$ | | | | |
| $r_{15}=58.890$ | $d_{15}=4.2$ | $n_{10}=1.62041$ | $\nu_{10}=60.3$ | $\nu_{C10}=60.99$ | $\theta_{10}=0.5413$ |
| $r_{16}=153.160$ | $d_{16}=0.1$ | | | | |
| $r_{17}=95.000$ | $d_{17}=4.2$ | $n_{11}=1.62041$ | $\nu_{11}=60.3$ | $\nu_{C11}=60.99$ | $\theta_{11}=0.5413$ |
| $r_{18}=\infty$ | $d_{18}=$variable | | | | |
| $r_{19}=-61.700$ | $d_{19}=1.5$ | $n_{12}=1.78305$ | $\nu_{12}=36.1$ | $\nu_{C12}=36.84$ | $\theta_{12}=0.584$ |
| $r_{20}=24.128$ | $d_{20}=9.3$ | $n_{13}=1.78472$ | $\nu_{13}=25.7$ | $\nu_{C13}=26.43$ | $\theta_{13}=0.6153$ |
| $r_{21}=-131.500$ | $d_{21}=9.5$ | | | | |
| $r_{22}=277.768$ | $d_{22}=2.0$ | $n_{14}=1.88300$ | $\nu_{14}=41.0$ | $\nu_{C14}=41.73$ | $\theta_{14}=0.5660$ |
| $r_{23}=45.442$ | $d_{23}=3.0$ | | | | |
| $r_{24}=-105.450$ | $d_{24}=1.5$ | $n_{15}=1.57501$ | $\nu_{15}=41.3$ | $\nu_{C15}=42.01$ | $\theta_{15}=0.5740$ |
| $r_{25}=24.674$ | $d_{25}=8.0$ | $n_{16}=1.60881$ | $\nu_{16}=58.9$ | $\nu_{C16}=60.23$ | $\theta_{16}=0.5431$ |
| $r_{26}=-35.570$ | | | | | | where $d_6$, $d_{11}$ and $d_{18}$ assume the following values in dependence upon focal lengths, $f$, involved:

| $f$ | $d_6$ | $d_{11}$ | $d_{18}$ |
|---|---|---|---|
| 58.82 | 2.443 | 103.980 | 5.743 |
| 219.68 | 77.242 | 19.103 | 15.819 |
| 308.25 | 101.442 | 0.765 | 9.957 |

References Cited

UNITED STATES PATENTS 3,377,119  4/1968  Takano ______________ 350—184

FOREIGN PATENTS 1,120,271  4/1956  France ______________ 350—184
1,148,776  5/1963  Germany ____________ 350—184

DAVID SCHONBERG, Primary Examiner

P. A. SACHER, Assistant Examiner

U.S. Cl. X.R.

350—214, 220